(12) United States Patent
LeCompte (10) Patent No.: US 7,818,952 B1
(45) Date of Patent: Oct. 26, 2010

(54) HOOF BOOT

(76) Inventor: Catheleen B LeCompte, 350 Bateman Rd., Barrington Hills, IL (US) 60010

( * ) Notice: Subject to any disclaimer, the term of this patent is extended or adjusted under 35 U.S.C. 154(b) by 0 days.

(21) Appl. No.: 12/220,554

(22) Filed: Jul. 26, 2008

Related U.S. Application Data (63) Continuation-in-part of application No. 11/888,084, filed on Jul. 31, 2007, and a continuation-in-part of application No. 11/888,087, filed on Jul. 31, 2007, and a continuation-in-part of application No. 29/308,316, filed on Jun. 10, 2008.

(51) Int. Cl.
*B68C 5/00* (2006.01)

(52) U.S. Cl. .............................................. 54/82; 168/18

(58) Field of Classification Search .................... 54/82; 168/18
See application file for complete search history.

(56) References Cited

U.S. PATENT DOCUMENTS

| | | | |
|---|---|---|---|
| 70,035 A | 10/1867 | Sloat | |
| 230,155 A | 7/1880 | Spence | |
| 349,668 A | 9/1886 | St. John | |
| 398,834 A * | 3/1889 | Hoyt | 54/82 |
| D26,832 S | 3/1897 | Hirsch | |
| 601,541 A | 3/1898 | Anderson | |
| 609,551 A | 8/1898 | Lang | |
| 1,039,002 A | 9/1912 | Winston | |
| 1,825,186 A | 9/1931 | Harsem | |
| 2,041,538 A | 5/1936 | Gash et al. | |
| 3,026,635 A * | 3/1962 | Slade | 36/7.3 |
| 3,236,310 A | 2/1966 | Quick | |
| 3,284,989 A * | 11/1966 | Code et al. | 54/82 |
| 3,486,561 A | 12/1969 | Kulak | |
| 4,189,004 A | 2/1980 | Glass | |
| 4,503,914 A | 3/1985 | Voland | |
| 4,736,800 A * | 4/1988 | Rohner | 168/18 |
| 4,981,010 A * | 1/1991 | Orza et al. | 54/82 |
| 5,129,461 A | 7/1992 | Igrow | |
| 5,176,221 A | 1/1993 | Aprill | |
| 5,588,288 A | 12/1996 | Origgi et al. | |
| 5,983,611 A | 11/1999 | Smahl et al. | |
| 6,516,594 B2 | 2/2003 | Clark et al. | |
| 2003/0167739 A1 | 9/2003 | Clark et al. | |
| 2004/0134669 A1 | 7/2004 | Kriesel et al. | |

OTHER PUBLICATIONS http://www.equineperformanceproducts.com/easyboot.htm.
http://www.davismanufacturing.com/products/horse_boot.html.

* cited by examiner

*Primary Examiner*—Son T. Nguyen

(57) ABSTRACT

A hoof boot enables a user to cover, protect and/or treat a hoof. The hoof boot comprises an elastic, hoof-enveloping casing. The casing comprises an interior surface area, an exterior surface area, a ground-contacting bottom portion, a hoof-contracting intermediate portion, and a boot-holding upper portion. The interior and exterior surface areas are non-parallel at the intermediate and upper portions for effecting axially-varied inwardly-directed radial return forces under hoof-based tensile stress from the upper to the bottom portion. The interior and exterior surface areas are substantially parallel at the bottom portion for effecting substantially uniform upwardly directed return forces under hoof-based compressive stress. The casing is elastically actuable and returnable during hoof loading/unloading for improving blood circulation in the hoof.

16 Claims, 11 Drawing Sheets

HOOF BOOT

PRIOR HISTORY

This application is a continuation-in-part patent application, which claims the benefit of pending U.S. patent application Ser. Nos. 11/888,084 and 11/888,087, both filed in the United States Patent and Trademark Office on Jul. 31, 2007; and U.S. Design patent application No. 29/308,316, filed in the United States Patent and Trademark Office on Jun. 10, 2008.

FIELD OF THE INVENTION

The present invention generally relates to an equine hoof boot assembly for outfitting an equine hoof or similar other anatomical structure having a relatively hard, keratinized, but expandable outer wall with a relatively soft tissue-lined, wall-protected cavity. More particularly, the present invention relates to a boot for outfitting an equine hoof or structure of similar form and function with a primary goal being the therapeutic treatment thereof.

DESCRIPTION OF THE PRIOR ART

It is not uncommon for a horse to develop an abscess on any of its hooves. Common methods for remedying hoof abscesses include drilling a hole into the hoof which then must usually be packed and soaked. To soak a horse hoof, farriers often recommend that horse care takers purchase any number of hoof-soaking boots, such as the so-called "EZ" brand boot or the DAVIS brand boot. The primary problem with these types of boots is that they often irritate the coronary band, the growing band of the hoof. Horses then often develop a secondary infection, which secondary infection then requires further treatment(s).

Equines frequently stand in mud and human caretakers must often do the same. Human caretakers in such situations, however, often don their shoes with some type of prior art galosh or rubber as a means to protect their shoes. During such an episode, the author contemplated that if a horse hoof could be outfitted with a galosh or similar other overshoe or boot constructed and formed to be properly outfitted upon a horse hoof, the use of awkward, clumsy soaking boots that often lead to secondary infections of the coronary band could be eliminated.

Notably, secondary infections of the coronary band can lead to malformations in the hoof as it grows or dynamically develops. Further, it is notable that the coronary band is essentially that boundary between soft tissue and hard tissue, similar to the cuticle on a human phalange. Just as an injured cuticle results in the malformation or other disruption to the human fingernail, so too does an injured coronary band result in disruption to the hoof wall.

It is further noted that, as donned upon many horses, the visual appearance of a typical therapeutic hoof boot is often less than desirable. If the aforementioned horse galosh or horse boot could be made from inexpensive materials, but structured so as to more effectually outfit a horse hoof, any number of color combinations could be easily incorporated into the design as a means to enhance the visual appearance of the therapeutic hoof boot assembly or otherwise ornamentally outfit the horse hoof. For example, show horses are often ornamented with various riding colors.

If a user were desirous of outfitting her show horse with hot pink colors, hot pink hoof boots could be provided for both ornamenting the horse's hooves as well as providing therapeutic treatment therefor, if ever required. A search into the state of the art reveals, however, that a number of articles attachable to an equine hoof are known in the prior art. Some of the more pertinent prior art relating to equine hoof boots and the like is briefly described, hereinafter.

U.S. Pat. No. 601,541 ('541 patent), which issued to Anderson, discloses a Horseshoe. The '541 patent teaches a rubber base ring having a central open portion and recessed on its upper, rear portion for the reception of the frog of the hoof, and a slitted rubber hoof band or envelope provided with fastening means. Notably, the '541 patent teaches an elastic hoof-receiving/protecting device sized and shaped to lie in inferior adjacency to the coronal band of the distal portion of an equine limb.

U.S. Pat. No. 609,551 ('551 patent), which issued to Lang, discloses a Non-Slipping Horseshoe. The '551 patent teaches an adjustable horse shoe or boot having a sole consisting of a sheet of flexible material provided with a slot or recess which extends forwardly from the rear edge of the sole and terminates at a distance from the toe or front edge thereof, dividing the sole into two adjustable sections which are connected by the unrecessed front portion of the sole and which can be expanded or contracted for varying the size of the horse shoe and an upper extending upwardly from the edge of said sole. Notably, the '551 patent teaches an elastic hoof-receiving/protecting device sized and shaped to lie in inferior adjacency to the coronal band of the distal portion of an equine limb.

U.S. Pat. No. 2,041,538 ('538 patent), which issued to Gash et al., discloses a Horseshoe. The '538 patent teaches a horseshoe comprises of a resilient material such as rubber and is either molded or shaped so that on being attached to the hoof of the horse by any suitable means the resilient material conforms to the external contour of the hoof and is retained in position thereon without fastening means formed separately from the shoe. The upper end of the horseshoe terminates below the fetlock of the horse.

U.S. Pat. No. 3,236,310 ('310 patent), which issued to Quick, discloses a Self-Fitting Boot Type Horse Shoe. The '310 patent teaches a hoof boot that is form-fitted to the hoof of a horse by heat shrinking the materials used. Notably, the '310 patent teaches an elastic hoof-receiving/protecting device sized and shaped to lie in inferior adjacency to the coronal band of the distal portion of an equine limb.

U.S. Pat. No. 5,983,611 ('611 patent), which issued to Smahl et al., discloses a Horse Shoe Cassette System. The '611 patent teaches a horse shoe cassette system for an animal's hoof. The cassette system comprises a plurality of hollow holders that are screwed into the hoof. Each holder has a threaded outside surface and a threaded inside opening defined therein. A flexible covering, of a general hollow ungulate shape to fit an ungulate's hoof, has a bottom plate that includes a first opening defined therein. A horse shoe is attached to the bottom plate of the flexible covering and the horse shoe has a second opening. A threaded screw member extends through the first and second openings and is screwed into the threaded inside opening of the holder disposed in the hoof. Noting the flexibility in the device of the '611 patent, it may be further noted that U.S. Pat. Nos. 4,189,004; 4,503,914; 5,588,288; 6,516,594; and United States Patent Application Publication No. 2003/0167739 all further teach flexible hoof-receiving or hoof-protecting devices of various types.

It may be seen from a further review of the above-referenced disclosures and other prior art generally known to exist that the prior art does not teach a low cost hoof boot for outfitting an equine hoof or similar other anatomical structure, which hoof boot comprises an elastic skin or casing for returning the expanded hoof under a load to a relaxed configuration via an incrementally increased boot wall thickness and an upper casing portion having a beaded band for providing periodically spaced rings of enhanced boot-retentive inwardly/radially directed forces. The prior art thus perceives a need for a low cost hoof boot or galosh of the foregoing type as a means to outfit and/or selectively treat, cover, and/or protect a hoof.

SUMMARY OF THE INVENTION

Accordingly, it is an object of the present invention to provide a certain boot construction for outfitting a hoof as a means to treat, cover, or protect a hoof for the exemplary purpose of treating a disorder or injury. To achieve these and other readily apparent objectives, the present invention provides a hoof boot comprising an outer hoof-enveloping casing constructed from an elastic material and having interior and exterior surface areas. Further, the hoof boot comprises a ground-contacting bottom casing portion, a hoof-contracting intermediate casing portion, and a boot-holding or boot-retentive upper casing portion.

The interior and exterior surface areas are preferably non-parallel at the intermediate and upper casing portions for effecting axially varied inwardly directed radial return forces under hoof-based or hoof-imparted tensile stress from the upper to bottom casing portions. The interior and exterior surface areas are further preferably substantially parallel at the bottom portion for effecting substantially uniform upwardly directed return forces under hoof-based or hoof-imparted compressive stress.

The interior or inner and exterior or outer surface areas at the intermediate portion respectively comprise first and second slopes, the second slope being steeper relative to the first slope, the first and second slopes thereby provide incrementing material thickness for providing the axially varied inwardly directed radial return forces under hoof-based or hoof-imparted tensile stress from the upper portion to the bottom portion.

The axially varied inwardly directed radial return forces ensure force-varied return of the hoof to a contracted hoof configuration during hoof unloading, which contracted hoof configuration anatomically functions to raise blood pressure within the hoof, promoting proper hoof circulation.

The upper casing portion comprises a beaded band having axially and periodically spaced regions of increased and reduced material thickness intermediate the inner and outer surface areas. The periodically spaced regions of increased and reduced material thickness operate to effect axially and periodically spaced regions of higher and lower boot-holding retentive forces.

The regions of increased material thickness further provide axially spaced structure for enhancing a user's ability to manually grip and don the hoof boot upon a hoof; and the regions of reduced material thickness provide axially spaced structure for enhancing a user's ability to trim the upper portion as may be required.

Notably, hoof structures are not a perfectly rigid structures, but elastic and flexible. When loaded during a step under the weight of an animal, the hoof physiologically changes its shape. This is a result of solar concavity or generally arched shape of the lateral profile of the hoof walls and sole, which has a variable depth, in the region of 1-1.5 cm.

When an unloaded hoof touches a firm underlying surface, there is only contact at the toe and heels (active contact). A loaded hoof has a much greater area of ground contact (passive contact), covering the lower wall edge, most of the sole, bars and frog. Active contact areas may be seen as slightly protruding spots in the walls and in the callused sole.

The shape changes in a loaded hoof are complex. The plantar arch flattens, the solar concavity generally decreases in depth and the heels spread. The hoof diameter increases to a "dilated" configuration and the pedal bone or third phalanx drops marginally into the hoof capsule.

Evidence suggests that a depression takes place during this motion, with blood pooling mainly into the wall's corium. When unloaded, the hoof restores its "contracted" configuration. During contraction, blood pressure raises, squeezing or pumping blood out. Further, there is a secondary pumping action, with the flexion of the foot, as it is raised. The hoof mechanism thus ensures an effective blood circulation into the hoof.

When outfitted upon the hoof mechanism, the casing of the present invention is elastically actuable (including tensile and compressive stresses) during weight compression or loading of the hoof primarily in response to increases in the hoof diameter, and secondarily in response to compressive forces in the material as sandwiched intermediate the hoof and the underlying surface. During weight removal from or unloading of the hoof, the casing is elastically returnable via restorative forces inherent in the material, which forces aid or quicken the contraction of the hoof to the relaxed, contracted configuration.

The hoof deforms or displaces from its relaxed configuration to a lesser degree at the upper portion and to a greater degree at the bottom portion. The incremental displacement is opposed by incrementally increasing interstitial material thickness of the hoof boot between the inner and outer surface areas for incrementally opposing the hoof deformation(s) with incrementally increasing return forces. The thickness at the bottom portion is substantially uniform for effecting substantially uniform return forces while in a loaded configuration.

Other objects of the present invention, as well as particular features, elements, and advantages thereof, will be elucidated or become apparent from, the following description and the accompanying drawing figures.

BRIEF DESCRIPTION OF THE DRAWINGS

Other features of my invention will become more evident from a consideration of the following brief description of patent drawings.

DETAILED DESCRIPTION OF THE PREFERRED EMBODIMENT

As stated above, this application is a continuation-in-part patent application, which claims the benefit of pending U.S. patent application Ser. Nos. 11/888,084 and 11/888,087, both filed in the United States Patent and Trademark Office on Jul. 31, 2007; and U.S. Design Patent Application No. 29/308,316, filed in the United States Patent and Trademark Office on Jun. 10, 2008.

The specifications and claimed subject matter set forth in said applications are hereby incorporated by reference thereto insofar as the teachings and disclosures therein presented support, or may be construed as having overlapping or common subject matter between those disclosures and this disclosure. This specification presents or references certain select portions of the formerly filed disclosures/applications as a means to highlight some of the key overlapping concepts in common between the successive applications.

Figure 1:
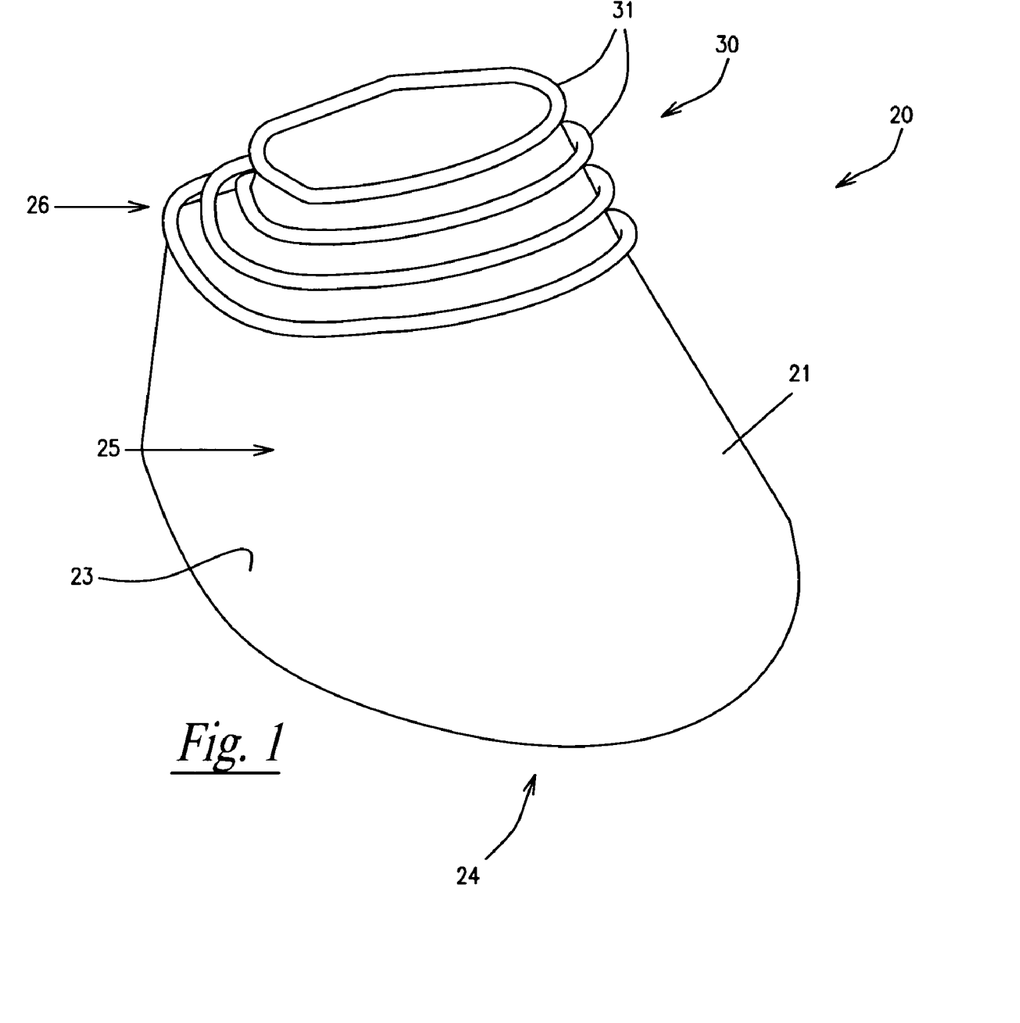
FIG. 1 is a top perspective view of the hoof boot according to the present invention.
Figure 2:
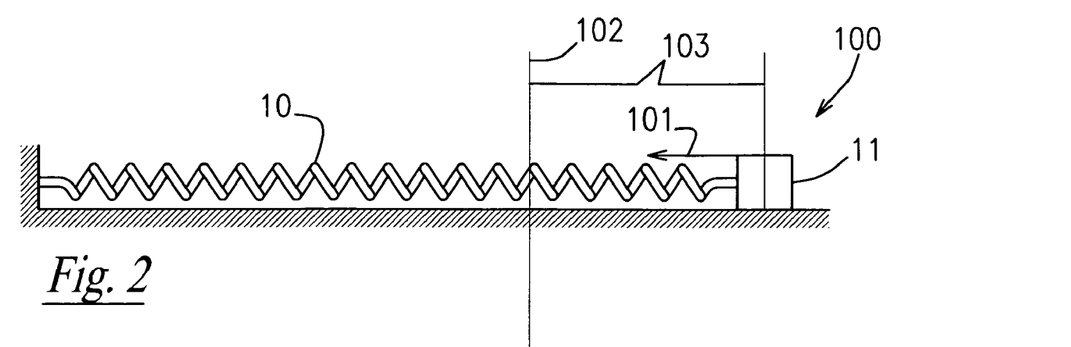
FIG. 2 is a first schematic depiction of a spring-block assembly in which the spring is exerting a return force on the block proportional to the block's tensioned or stretched displacement from an equilibrium position of the assembly.
Figure 3:
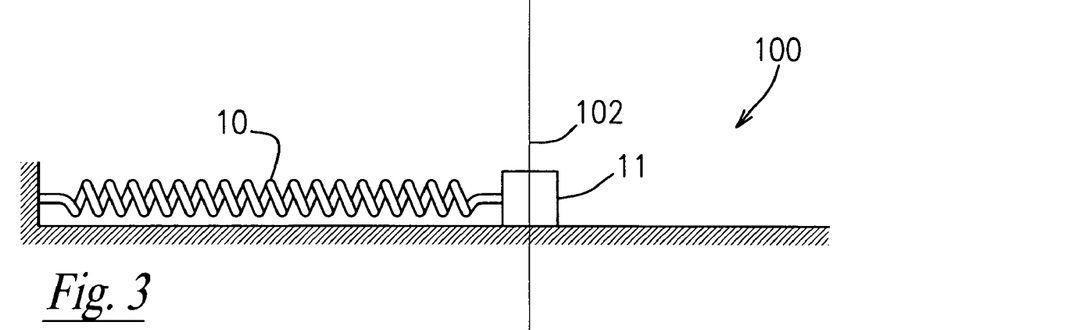
FIG. 3 is a second schematic depiction of a spring-block assembly in which the spring and block are at the relaxed equilibrium position of the assembly.
Figure 4:
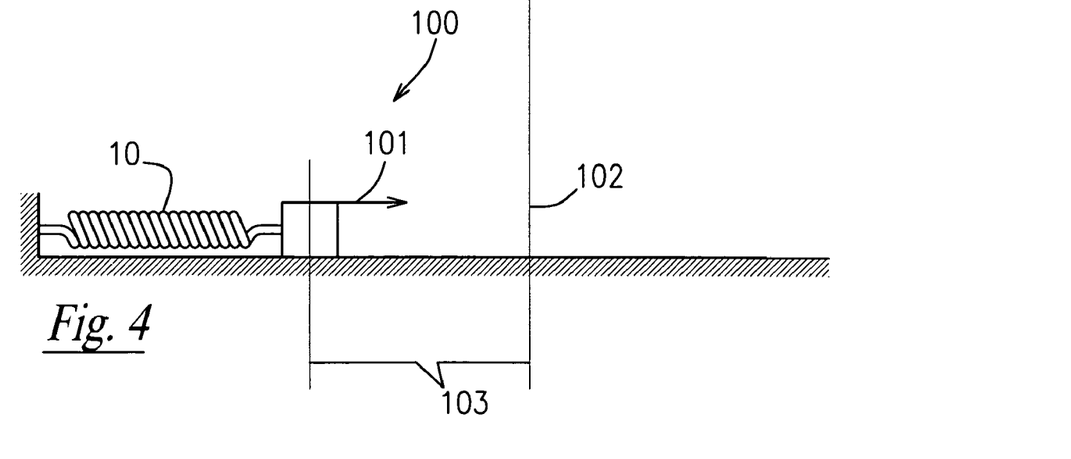
FIG. 4 is a third schematic depiction of a spring-block assembly in which the spring is exerting a return force on the block proportional to the block's compressed displacement from the equilibrium position of the assembly.
Figure 5:
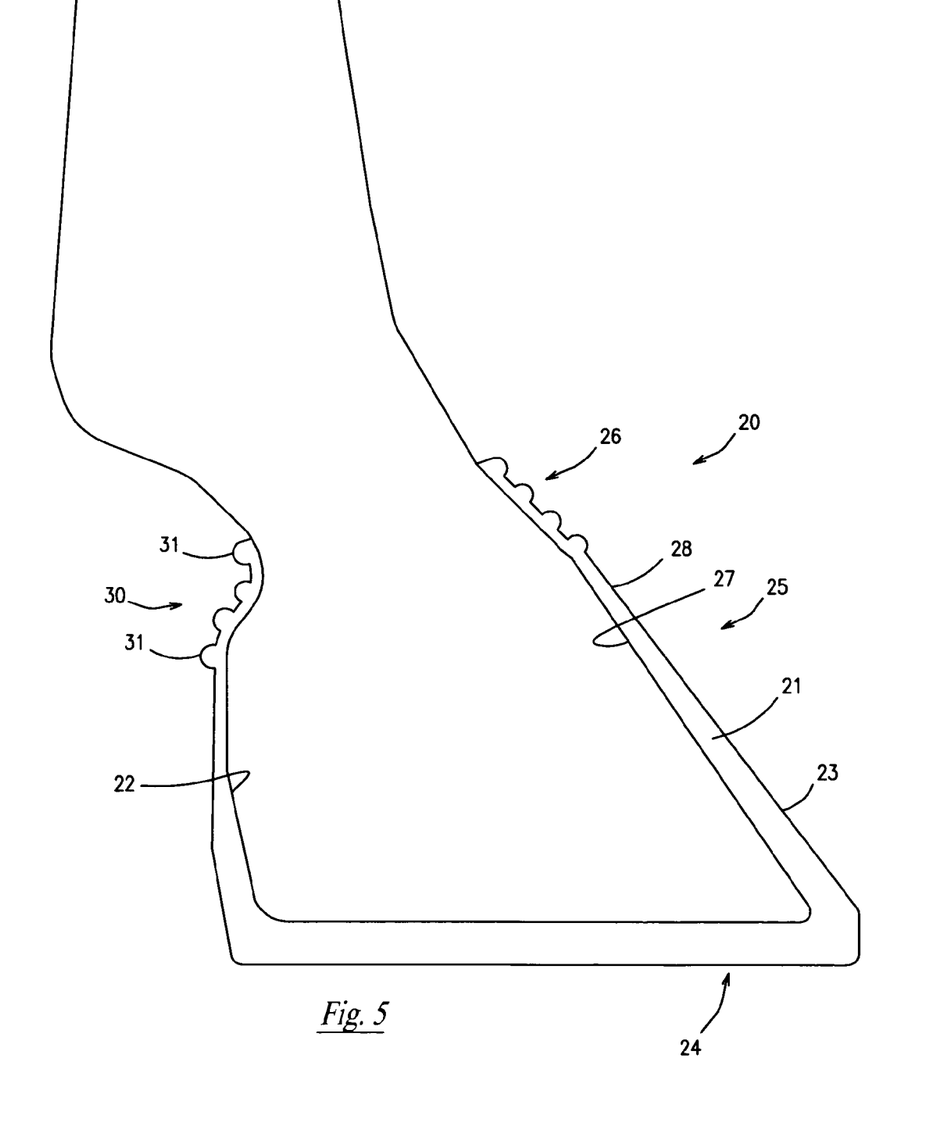
FIG. 5 is a cross-sectional side view depiction of the hoof boot according to the present invention outfitted upon a hoof.
Figure 6:
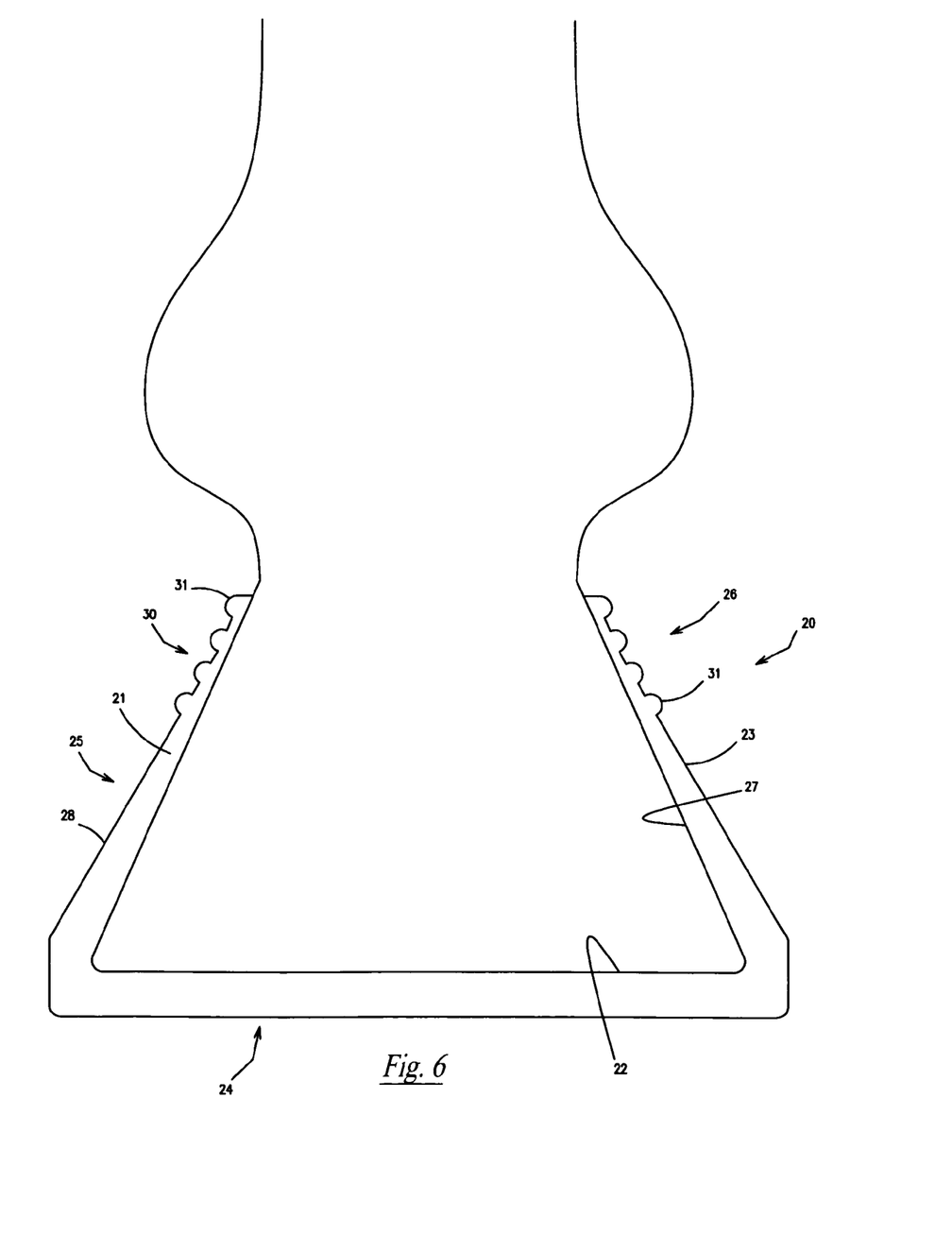
FIG. 6 is a cross-sectional frontal view depiction of the hoof boot according to the present invention outfitted upon a hoof.

Turning then to the drawings of this specification, the reader may consider the block-spring system 100 schematically depicted in FIGS. 2-4. According to classical physical principles, the force 101 exerted by the spring 10 on the block 11 varies with the displacement 103 of the block 11 from the relaxed equilibrium position 102. This illustrated relationship may be written as:

$$F = -k \cdot x$$

(otherwise known as Hooke's Law), where "F" is the restoring spring force 101, "k" is an effective spring or force constant, and "x" is the magnitude of the displacement 103 from the relaxed equilibrium position 102. The negative sign indicates that the force 101 acts in a direction opposite the direction of displacement 103.

When the displacement 103 is positive as may be exhibited with the stretched spring 10 in FIG. 2, the restoring spring force 101 is directed to the left and when the displacement 103 is negative as may be exhibited with the compressed spring 10 depicted in FIG. 4, the spring force 101 is directed to the right. It then follows that when the displacement 103 from the equilibrium position 102 is zero (i.e. the natural or relaxed length of the spring 10), the restoring force 101 is zero as generally depicted in FIG. 3.

From a physical perspective, Hooke's law of elasticity is an approximation stating that the amount by which a material body is deformed (i.e. the strain) is linearly related to the force causing the deformation (i.e. the stress). Materials for which Hooke's law is a useful approximation are sometimes known as linear-elastic materials and are often modeled by a spring such as the spring 10 illustrated in FIGS. 2-4. Objects that quickly or instantaneously regain their original shape after being deformed by a stress, with the molecules or atoms of their material returning to the initial state of stable equilibrium, are generally governed by Hooke's law.

Strictly speaking, Hooke's law only holds for some materials under certain loading conditions. Steel, for example, exhibits linear-elastic behavior for stresses below the yield strength and thus Hooke's law is valid for steel throughout its elastic range. For some other materials, however, such as aluminum, Hooke's law is only valid for a portion of the elastic range. For aluminum and similar other materials, a proportional limit stress is defined, below which the errors associated with the linear approximation are negligible.

In most elastic materials, such as metals used in springs, the elastic behavior is caused by bond distortions. In other words, when a force is applied, bond lengths deviate from the (minimum energy) equilibrium, and strain energy is stored electrostatically. Rubber, perhaps the most common elastic material that comes to mind, is often assumed to behave in the same way, but it turns out this is a poor description. Rubber is a curious material because, unlike metals, strain energy is stored thermally, as well as electrostatically.

In its relaxed state rubber consists of entangled, spaghetti-like polymer chains that are occasionally interlinked. Between a pair of links each monomer can rotate freely about its neighbor. This gives each section of chain leeway to assume a large number of geometries, very much akin to a loose rope attached to a pair of fixed points. At room temperature rubber stores enough kinetic energy so that each section of chain oscillates chaotically, as if the piece of rope cited in the foregoing example were being shaken violently.

When rubber is stretched, however, the "loose pieces of rope" are placed under tension and are thus no longer able to oscillate. Their kinetic energy is given off as excess heat. The entropy of the material decreases when going from the relaxed to the stretched state, and increases during relaxation. This change in entropy can also be explained by the fact that a tight section of chain can fold in fewer ways than a loose section of chain, at a given temperature.

Relaxation of a rubber otherwise under tension is thus driven by an increase in entropy, and the force experienced is not purely electrostatic; rather it is primarily a result of the thermal energy of the material being converted to kinetic energy. Rubber relaxation is endothermic and the material undergoes adiabatic cooling during contraction, which may be detected by placing thermally sensitive measurement means in contact with a relaxing rubber material (such as one's lips against a relaxing rubber band). During relaxation the material becomes noticeably cooler.

Stretching of a rubber material is in some ways equivalent to the compression of an ideal gas, and relaxation of a rubber material is in some ways equivalent to expansion of an ideal gas. It is thus noted that a compressed gas also exhibits certain "elastic" properties. Despite the counterintuitive notion that may come to mind, a rubber material in tension, if viewed one dimensionally, is akin to gas compression insofar as the stretched material exhibits a reduction in space available to each section of the spaghetti-like polymer chain(s) (i.e. all those loose ropes being pulled taught collectively occupy less space).

Invoking the theory of rubber elasticity, one may thus consider a polymer chain in a cross-linked network as an entropic spring. When the chain is stretched, the entropy is reduced by a large margin because there are fewer conformations available. Therefore, there is a restoring force, which causes the polymer chain to return to its equilibrium or relaxed, unstretched state, such as a high entropy random coil configuration, once the external force is removed. This is one explanation for why rubber bands return to their original relaxed equilibrium state when a load is removed.

Referring now to FIGS. 1 and 5-16, the reader may further and pictorially consider the hoof boot 20 according to the present invention. Hoof boot 20 preferably comprises an outer hoof-enveloping casing 21 preferably being constructed from a material having elastic properties, such as natural rubber (preferably having a durometer on the order of 25).

The casing 21 comprises an interior surface 22 having a certain interior surface area; an exterior surface 23 having a certain exterior surface area substantially greater in magnitude than the interior surface area; a ground-contacting bottom casing portion 24; a hoof-covering or hoof-contracting intermediate casing portion 25; and a boot-holding or boot-retaining upper casing portion 26.

It may be seen from an inspection of the noted figures that the interior and exterior surfaces 22 and 23 are preferably non-parallel at the intermediate and upper casing portions 25 and 26 for effecting axially-varied, inwardly-directed radial return forces as at 110 under hoof-based or hoof-imparted tensile stress from the upper casing portion 26 to the bottom casing portion 24.

Figure 7:
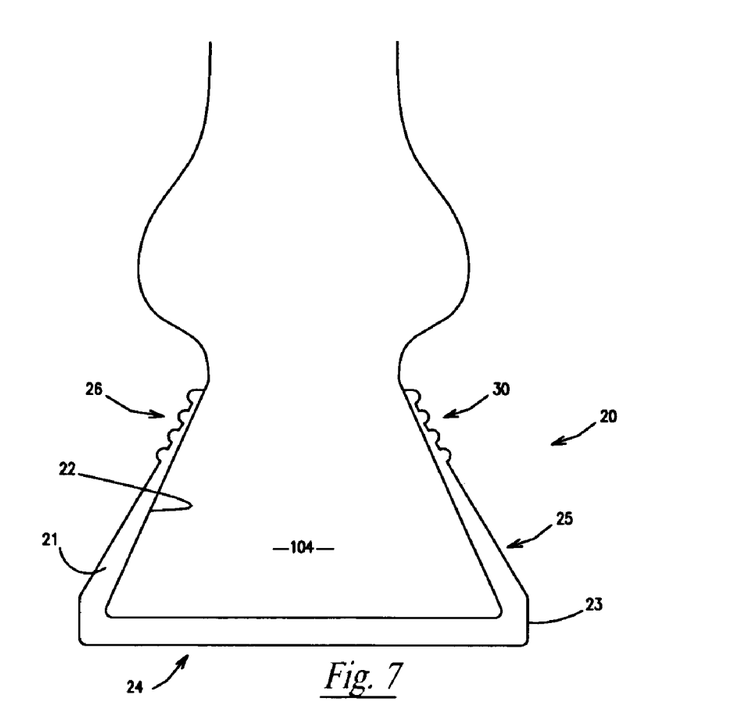
FIG. 7 is a reduced depiction of the hoof boot and hoof otherwise depicted in FIG. 6 showing the hoof in a relaxed state and the hoof boot in an actuated first boot configuration.
Figure 8:
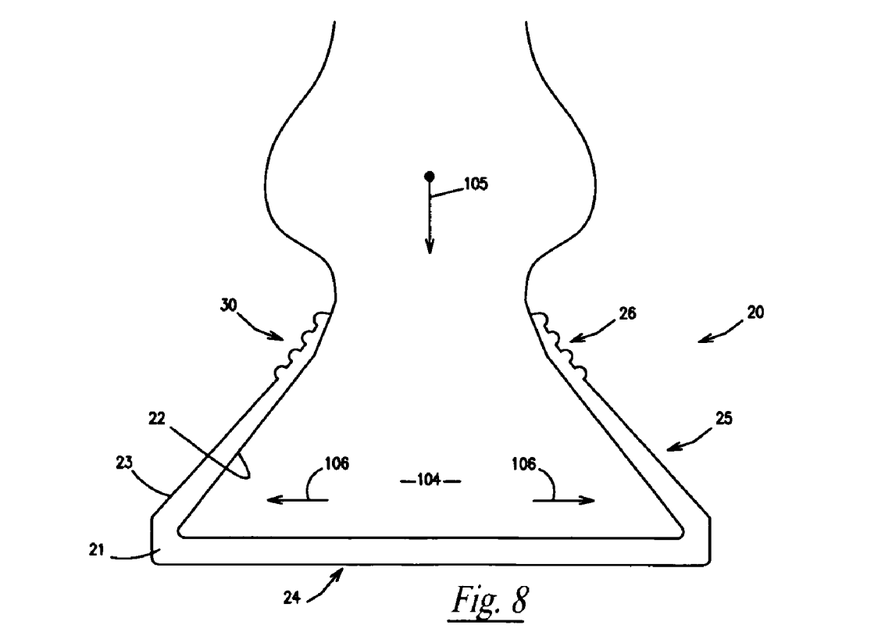
FIG. 8 is a cross-sectional frontal view depiction of the hoof boot and hoof showing the hoof in a loaded state and the hoof boot in an actuated second configuration.

The hoof-based or hoof-imparted tensile stress is induced via loading of the hoof 104 under weight as at 105 as the hoof expands (as at 106) as comparatively depicted in FIG. 7 versus FIG. 8. In other words, the tensile stress in the casing 21 originates from the dynamic hoof expansion under the load 105 of the animal as it steps upon its hoof 104.

Figure 9:
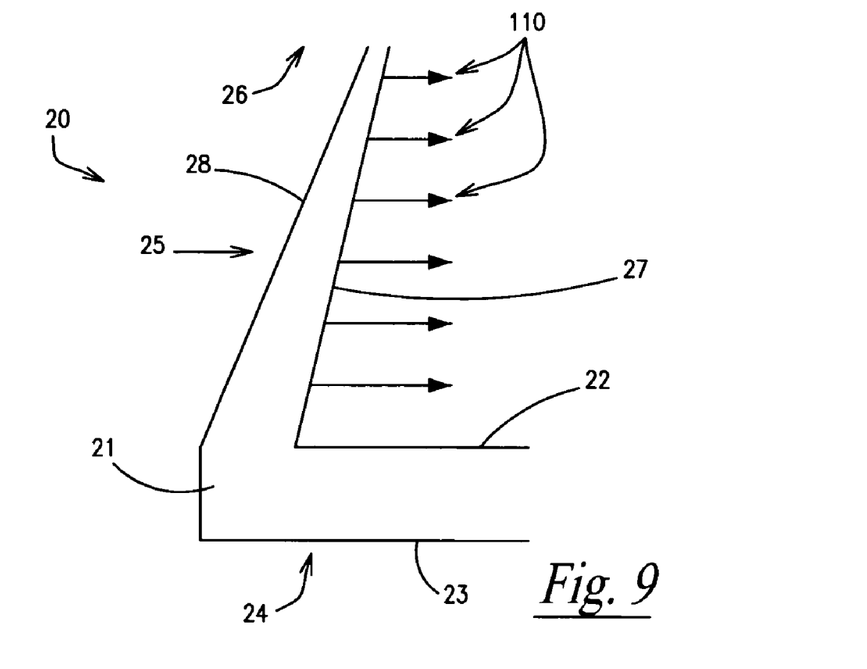
FIG. 9 is an enlarged fragmentary sectional and diagrammatic depiction of the lower left portion of the hoof boot otherwise depicted in FIG. 7, depicting incrementally increasing return forces of the actuated first boot configuration.
Figure 10:
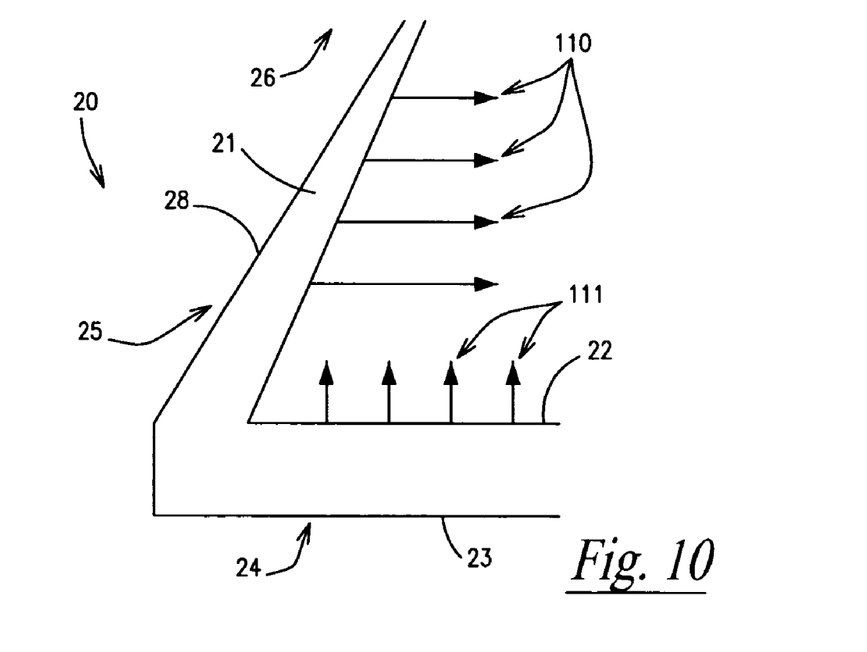
FIG. 10 is an enlarged fragmentary sectional and diagrammatic depiction of the lower left portion of the hoof boot otherwise depicted in FIG. 8, depicting incrementally increasing return forces of the actuated second boot configuration.

The interior and exterior surfaces 22 and 23 at the intermediate casing portion 25 respectively comprise first and second slopes as at 27 and 28 in FIGS. 9 and 10. It may be seen from an inspection of the noted figures that the first slope 27 is steeper relative to the second slope 28 and that the interstitial material between the surfaces 22 and 23 is incrementally thicker as traced from the upper casing portion 26 to the bottom casing portion 24.

The first and second slopes 27 and 28 of the interior and exterior surfaces 22 and 23 thus essentially function to increment the axially varied inwardly directed radial return forces 110 under hoof-based or hoof-imparted tensile stress from the upper casing portion 26 to the bottom casing portion 24. It is believed that the axially varied inwardly directed radial return forces 110 function to enhance or ensure a force-varied return of the hoof 104 to a contracted hoof configuration during hoof unloading, which contracted hoof configuration, as earlier stated, raises blood pressure within the hoof 104 and thereby promotes circulation within the hoof 104.

In this last regard, it is again noted that the shape changes in a loaded hoof 104 are complex. The plantar arch flattens, the solar concavity generally decreases in depth and the heels spread. The hoof diameter increases to a "dilated" configuration and the pedal bone or third phalanx drops marginally into the hoof capsule.

Evidence suggests that a depression takes place during this motion, with blood pooling mainly into the wall's corium. When unloaded, the hoof restores its "contracted" configuration. During contraction, blood pressure raises, squeezing or pumping blood out. Further, there is a secondary pumping action, with the flexion of the foot, as it is raised. It is thus contemplated that the unique structural configuration of the hoof boot 20 helps ensure an effective blood circulation into the hoof 104.

When outfitted upon the hoof 104, the casing 21 of the present invention is elastically actuable (under both tensile and compressive stresses) during weight compression or loading of the hoof 104 primarily in response to increases in the hoof diameter, and secondarily in response to compressive forces in the material as sandwiched intermediate the hoof 104 and the underlying surface. During weight removal from or unloading of the hoof 104, the casing 21 is elastically returnable via restorative forces inherent in the material, which forces aid, ensure, or quicken the contraction of the hoof 104 to the relaxed, contracted configuration.

The hoof 104 expands, deforms or displaces from its relaxed configuration to a lesser degree at the upper portion and to a greater degree at the bottom portion. The incremental displacement is opposed by incrementally increasing interstitial material thickness of the hoof boot 20 between the inner and outer surfaces 22 and 23 for incrementally opposing the hoof deformation(s) with incrementally increasing return forces 110.

The material thickness at the bottom casing portion 24 is preferably and substantially uniform for effecting substantially uniform return forces 111 under hoof-based or hoof-imparted compressive stress while in a loaded configuration as generally depicted in FIG. 10. In other words, the interior and exterior surfaces 22 and 23 are substantially parallel at the bottom casing portion 24 for effecting substantially uniform upwardly directed return forces 111 under hoof-based or hoof-imparted compressive stress.

Figure 11:
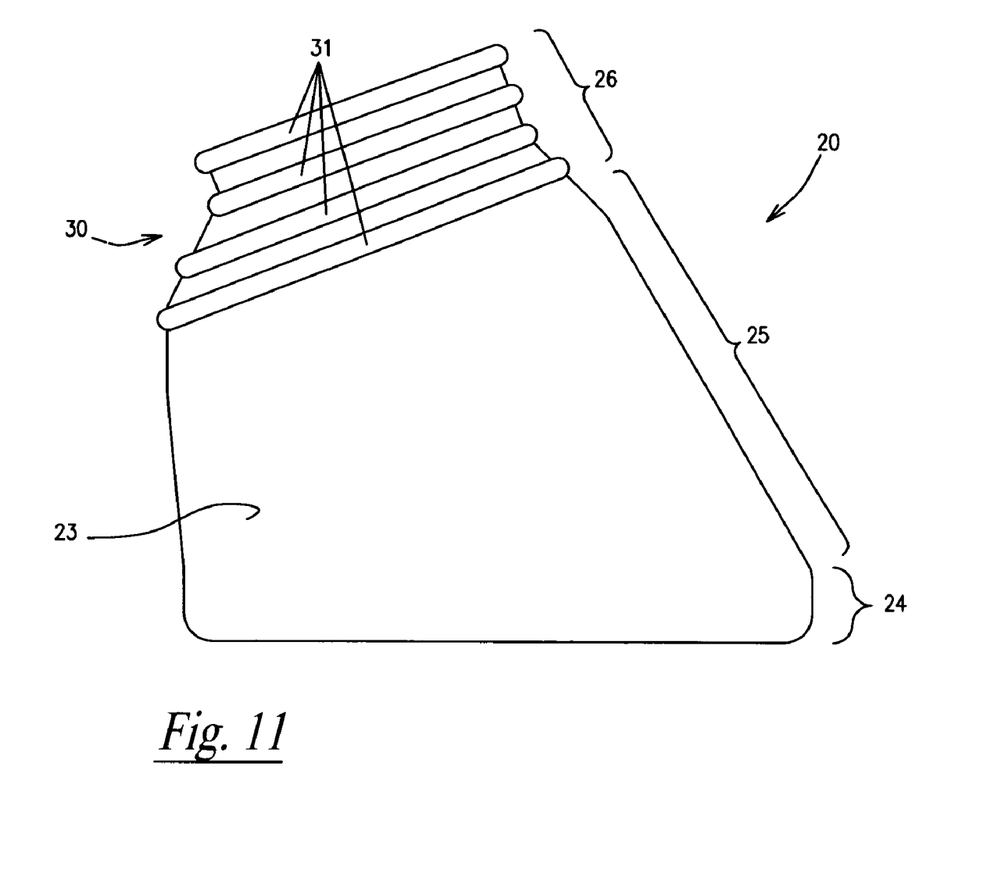
FIG. 11 is a right side plan view of the hoof boot according to the present invention.

Notably, the upper portion of the boot or the upper casing portion 26 preferably comprises a beaded band 30, the width or depth of which is generally referenced in FIG. 11. The beaded band 30 comprises axially and periodically spaced regions of increased material thickness and reduced material thickness intermediate the inner and outer surfaces 22 and 23. The regions of increased material thickness may be referred to as beads 31, and together the collection of axially and periodically spaced beads 31 forms the beaded band 30.

Figure 12:
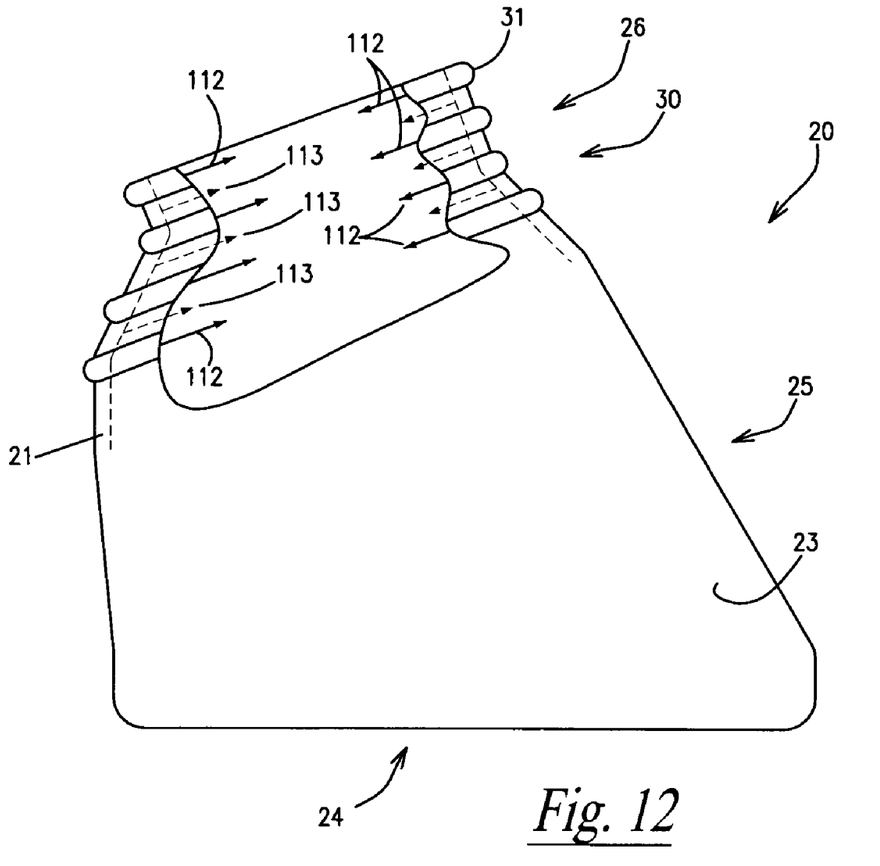
FIG. 12. is a more detailed depiction of the hoof boot otherwise shown in FIG. 11 with certain parts broken away to highlight a periodic arrangement of return forces at the beaded band portion of the upper boot.
Figure 13:
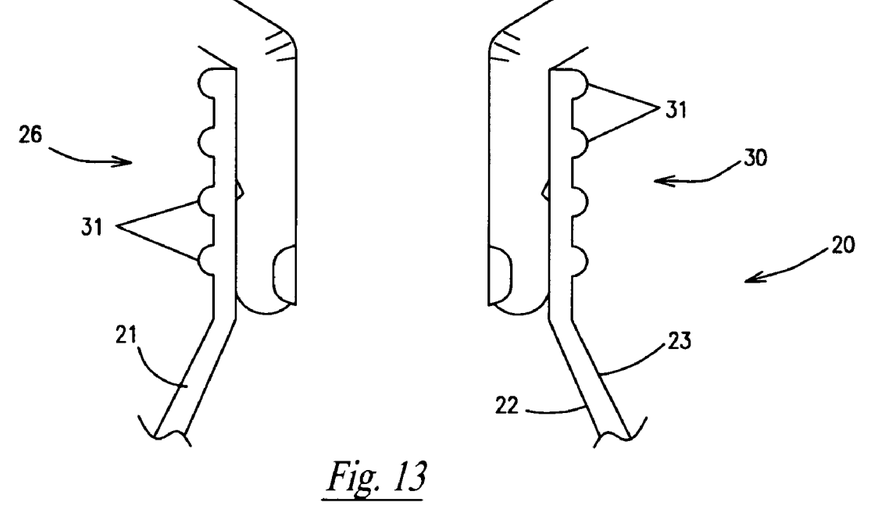
FIG. 13 is a first sequential fragmentary frontal view depiction of fingers engaging the inner boot surface at the upper boot or beaded band portion prior to actuating the beaded band for the purpose of outfitting the same upon a hoof.
Figure 14:
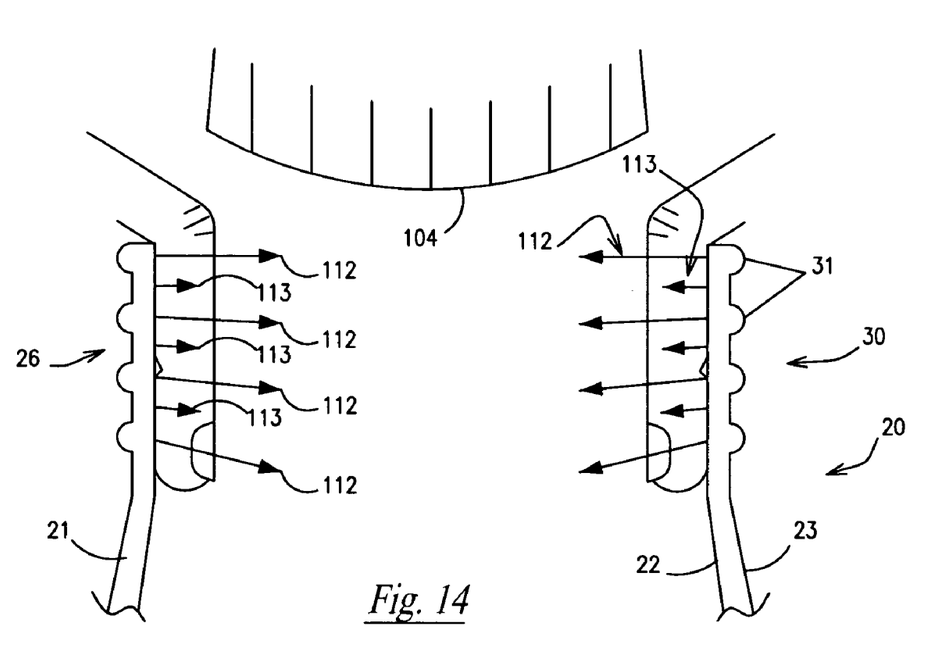
FIG. 14 is a second sequential fragmentary frontal view depiction of fingers actuating the inner boot surface at the upper boot or beaded band portion for the purpose of outfitting the same upon a hoof.
Figure 15:
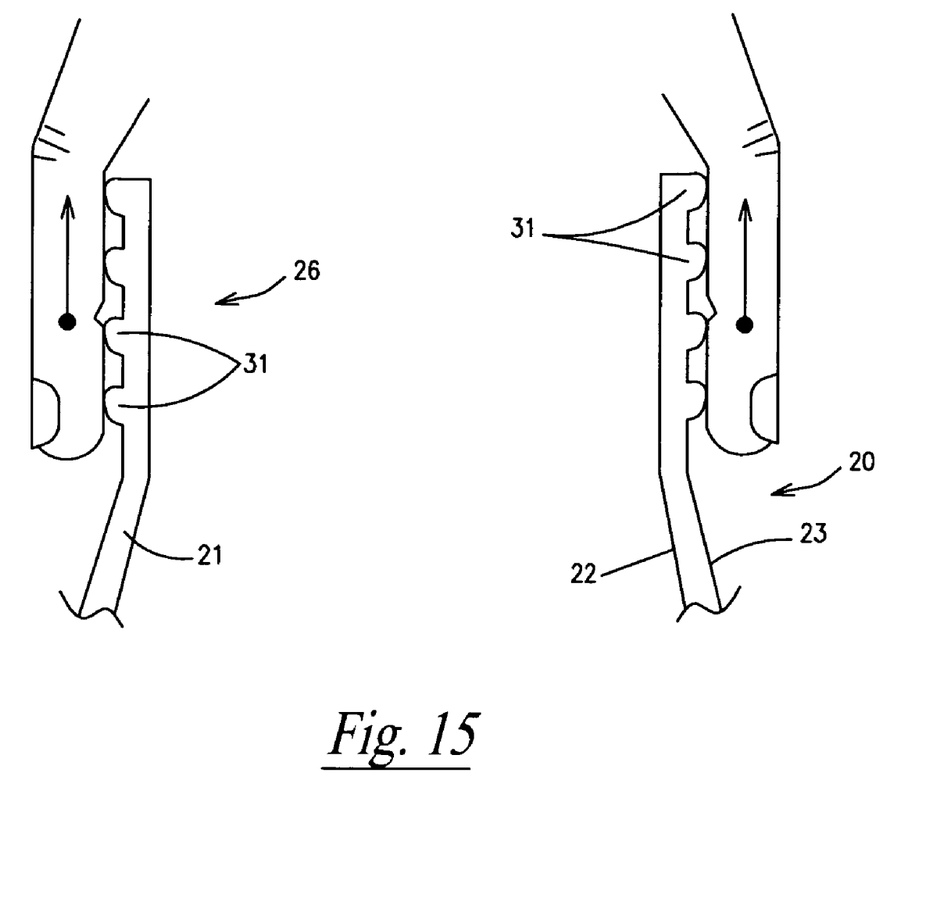
FIG. 15 is a fragmentary frontal view depiction of fingers engaging the outer boot surface at the upper boot or beaded band portion and directed upward for the purpose of outfitting the hoof boot upon a hoof.

It is contemplated that the periodically spaced regions of increased and reduced material thickness essentially functions to effect axially and periodically spaced regions of greater boot-holding retentive forces as at 112 and lesser boot-holding retentive forces as at 113 in FIGS. 12 and 14. It is further contemplated that the regions of increased material thickness or the beads 31 of the beaded band 30 provide axially spaced structure for enhancing a users ability to manually grip and don the hoof boot 20 upon a hoof 104. In this regard, FIG. 15 depicts fingers manually gripping, contacting, or frictionally engaging the beads 31 and forcing (deflecting) them upward so as to help the user don the boot 20.

The regions of increased material thickness or beads 31 of the beaded band 30 each preferably comprise a rounded cross-section at the exterior surfaces 23 for reducing stress concentration development within the material and thereby functions to enhance the useful life of the boot 20 by reducing wear and tear tendencies within the material. In other words, the rounded tips of the beads 30 function to allow matter to more easily slide past the bead tips and preventing unintended snags and the like, but further function to enable the user to grip the beaded structures or beads 30 when he or she intends to don the boot 20.

Figure 16:
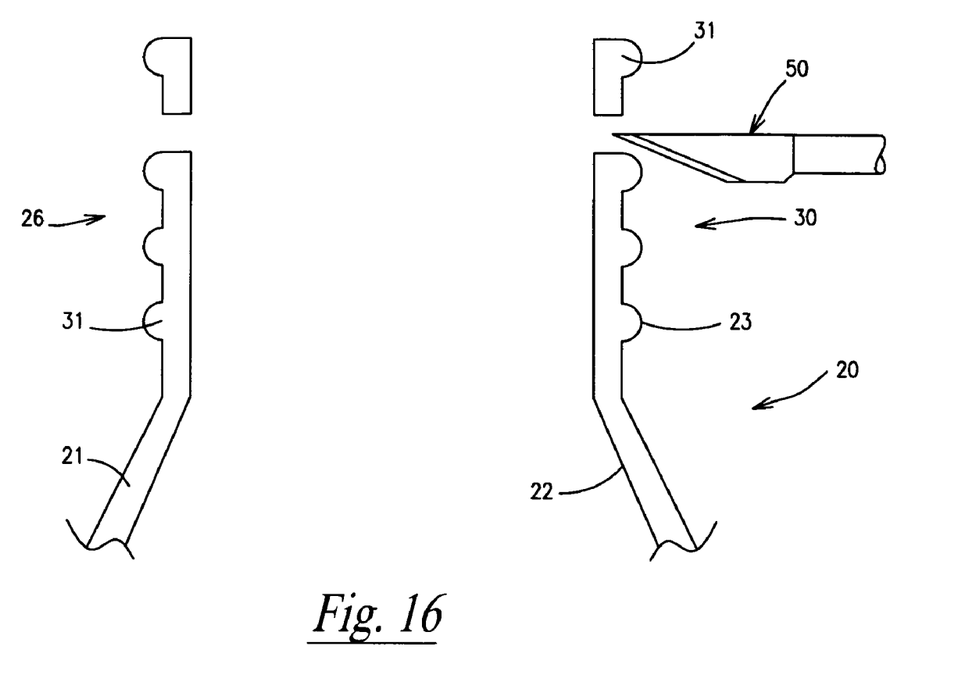
FIG. 16 is a fragmentary frontal view depiction of a blade slicing through a reduced material thickness intermediate the first and second beads of the beaded band at the upper boot or beaded band portion for the purpose of trimming the hoof boot as may be required.

The regions of reduced material thickness intermediate the beads are believed to provide the beaded band with axially spaced structure for enhancing a user's ability to trim the upper portion 26 as may be required. In other words, it is believed that the regions of reduced material thickness provide guideway(s) or grooves for enabling a blade 50 or similar other instrument to trim excess portions away from the upper portion 26 as may be required.

The hoof boot 20 according to the present invention is thus primarily designed for treating a hoof 104 so as therapeutically react to the evolutionarily developed loading/unloading cycle of the hoof 104 and to prevent disruption of the complex shape changes that occur during said cycle. Notably, it does not place relatively rigid, volume-occupying inlays into the hoof cavity or attach itself to the hoof 104 via relatively rigid fastening hardware, all of which may be viewed as disruptive to the normal loading-unloading cycle of the hoof 104 and thus generally disruptive to hoof health by handicapping effective blood circulation.

The hoof boot 20 further provides a protective, interfacial barrier intermediate the equine hoof 104 and the underlying surface or matter so as to prevent foreign matter (e.g. bacteria) from gaining access to the hoof 104. By shielding the hoof 104 and enhancing blood flow therein, the hoof boot 20 not only protects the hoof 104 from further infection or contamination, but functions to aid the natural pumping action of the hoof 104.

While the above description contains much specificity, this specificity should not be construed as limitations on the scope of the invention, but rather as an exemplification of the invention. For example, as is described hereinabove, it is contemplated that the present invention essentially discloses a hoof boot for covering and/or protecting a hoof, which hoof boot essentially comprises a uniquely configured elastic, hoof-enveloping casing.

The casing has an inner surface area or inner surface, an outer surface area or outer surface, a ground-contacting bottom portion, a hoof-covering intermediate portion, and a boot-retaining upper portion. The inner and outer surfaces are non-parallel at the intermediate and upper portions for effecting axially varied inwardly directed radial return forces under tensile stress from the upper to the bottom portion. The inner and outer surfaces are further preferably and substantially parallel at the bottom portion for effecting substantially uniform upwardly directed return forces under compressive stress.

The inner and outer surfaces at the intermediate portion respectively comprise first and second slopes, the first slope being steeper relative to the second slope such that the interstitial material between the first and second slopes are incrementally thicker from the upper portion to the bottom portion for incrementing axially varied inwardly directed radial return forces (from the upper portion to the bottom portion) as emanating from tensile stress or loads imparted from expansion of the hoof under the weight of the animal.

The upper portion further preferably comprises a beaded band having axially and periodically spaced regions of increased and reduced material thickness intermediate the inner and outer surface areas. The periodically spaced regions of increased and reduced material thickness effect axially and periodically spaced regions of greater and lesser boot-retentive forces.

The regions of increased material thickness of the beaded band provide axially spaced structure for enhancing a user's ability to manually grip and don the hoof boot, which regions of increased material thickness preferably comprise rounded cross-sections at the exterior surface area for reducing stress concentration development within the material. The regions of reduced material thickness of the beaded band provide axially spaced structure for enhancing a user's ability to trim the upper portion as may be required.

Accordingly, although the invention has been described by reference to a preferred embodiment, it is not intended that the novel boot assembly be limited thereby, but that modifications thereof are intended to be included as falling within the broad scope and spirit of the foregoing disclosure, the following claims and the appended drawings.

I claim:

1. A hoof boot, the hoof boot comprising a hoof-enveloping casing, the casing having an inner surface, an outer surface, a bottom casing portion, an intermediate casing portion, and an upper casing portion, the inner and outer surfaces being non-parallel at the upper and intermediate casing portions for effecting axially varied inwardly directed radial forces through the upper and intermediate casing portions, the inner and outer surfaces being substantially parallel at the bottom casing portion for effecting substantially uniform upwardly directed return forces at the bottom casing portion, the upper casing portion comprising a beaded band, the beaded band having axially and periodically spaced regions of increased and reduced material thickness intermediate the inner and outer surfaces thereby forming circumferentially extending beads at the outer surface, the axially and periodically spaced, circumferentially extending beads for effecting axially and periodically spaced regions of greater and lesser boot-retentive forces, the beads comprising a rounded cross-section at the outer surface, the rounded cross-sections for reducing stress concentration development.

2. The hoof boot of claim 1 wherein the inner and outer surfaces at the intermediate casing portion respectively comprise first and second slopes, the first slope being steeper relative to the second slope, the first and second slopes for incrementing the axially varied inwardly directed radial forces.

3. The hoof boot of claim 2 wherein the axially varied inwardly directed radial forces ensure force-varied return of the hoof to a contracted hoof configuration during hoof unloading, the contracted hoof configuration for raising blood pressure within the hoof thereby promoting circulation within the hoof.

4. The hoof boot of claim 1 wherein the regions of increased material thickness of the beaded band provide axially spaced structure or enhancing a user's ability to manually grip and don the hoof boot.

5. The hoof boot of claim 1 wherein the regions of reduced material thickness of the beaded band provide axially spaced structure for enhancing a user's ability to trim the upper portion as may be required.

6. A hoof boot for treating a hoof, the hoof boot comprising an outer hoof-enveloping casing, the casing being constructed from an elastic material and having an interior surface area, an exterior surface area, a ground-contacting bottom portion, a hoof-contracting intermediate portion, and a boot-retaining upper portion, the interior and exterior surface areas being non-parallel at the intermediate and upper portions for effecting axially varied inwardly directed radial return forces under hoof-imparted tensile stress through the intermediate and upper portions, the interior and exterior surface areas being substantially parallel at the bottom portion for effecting substantially uniform upwardly directed return forces under hoof-imparted compressive stress at the bottom portion, the upper portion comprising a beaded band, the beaded band having axially and periodically spaced regions of increased and reduced material thickness intermediate the interior and exterior surface areas thereby creating a plurality of circumferentially-extending, raised beads at the exterior surface area, the raised beads for effecting axially and periodically spaced regions of greater and lesser boot-holding retentive forces.

7. The hoof boot of claim 6 wherein the beads each comprise a rounded cross-section at the exterior surface area, the rounded cross-sections for reducing stress concentration development within the elastic material.

8. The hoof boot of claim 7 wherein the beads provide axially spaced structure or enhancing a user's ability to manually grip and don the hoof boot upon a hoof.

9. The hoof boot of claim 7 wherein the regions of reduced material thickness of the beaded band provide axially spaced structure for enhancing a user's ability to trim the upper portion as may be required.

10. The hoof boot of claim 6 wherein the axially varied inwardly directed radial return forces ensure force-varied return of the hoof to a contracted hoof configuration during hoof unloading, the contracted hoof configuration for raising blood pressure within the hoof thereby promoting circulation within the hoof.

11. A hoof boot for covering a hoof, the hoof boot comprising an elastic hoof-enveloping casing, the casing having an inner surface, an outer surface, a ground-contacting bottom portion, a hoof-covering intermediate portion, and a boot-retaining upper portion, the boot-retaining upper portion comprising a cylindrical top half and a frustoconical bottom half, the inner and outer surfaces being non-parallel at the intermediate and upper portions for effecting axially varied inwardly directed radial return forces under hoof-imparted tensile stress through the intermediate and upper portions, the upper portion comprising a beaded band at the top and bottom halves, the beaded band having axially and periodically spaced regions of increased and reduced material thickness intermediate the inner and outer surfaces thereby forming raised, circumferentially extending beads at the outer surface, said beads for effecting axially and periodically spaced regions of greater and lesser boot-retentive forces.

12. The hoof boot of claim 11 wherein said beads each comprise a rounded cross-section at the outer surface, the rounded cross-sections for reducing stress concentration development within the material.

13. The hoof boot of claim 11 wherein the beads provide axially spaced structure or enhancing a user's ability to manually grip and don the hoof boot.

14. The hoof boot of claim 11 wherein the regions of reduced material thickness of the beaded band provide axially spaced structure for enhancing a user's ability to trim the upper portion as may be required.

15. The hoof boot of claim 11 wherein the inner and outer surfaces are substantially parallel at the bottom portion for effecting substantially uniform upwardly directed return forces under compressive stress at the bottom portion.

16. The hoof boot of claim 15 wherein the inner and outer surfaces at the intermediate portion respectively comprise first and second slopes, the first slope being steeper relative to the second slope, the first and second slopes for incrementing the axially varied inwardly directed radial return forces.

* * * * *